(12) United States Patent
Strei et al.

(10) Patent No.: US 10,209,154 B2
(45) Date of Patent: Feb. 19, 2019

(54) IN-LINE PROCESS FLUID PRESSURE TRANSMITTER FOR HIGH PRESSURE APPLICATIONS

(71) Applicant: Rosemount Inc., Shakopee, MN (US)

(72) Inventors: David M. Strei, Waconia, MN (US); Charles R. Willcox, Chanhassen, MN (US); Blake T. Petersen, Minnetonka, MN (US); David A. Broden, Andover, MN (US)

(73) Assignee: Rosemount Inc., Shakopee, MN (US)

( * ) Notice: Subject to any disclaimer, the term of this patent is extended or adjusted under 35 U.S.C. 154(b) by 121 days.

(21) Appl. No.: 14/672,647

(22) Filed: Mar. 30, 2015

(65) Prior Publication Data

US 2016/0290882 A1    Oct. 6, 2016

(51) Int. Cl.
| | |
|---|---|
| *G01L 9/00* | (2006.01) |
| *G01L 7/00* | (2006.01) |
| *G01L 13/00* | (2006.01) |
| *B23K 31/02* | (2006.01) |
| *G01L 19/00* | (2006.01) |
| *G01L 19/08* | (2006.01) |
| *B23K 103/04* | (2006.01) |

(52) U.S. Cl.
CPC ............ *G01L 9/0041* (2013.01); *B23K 31/02* (2013.01); *G01L 19/003* (2013.01); *G01L 19/086* (2013.01); *B23K 2203/05* (2015.10)

(58) Field of Classification Search
None
See application file for complete search history.

(56) References Cited

U.S. PATENT DOCUMENTS

| | | | | |
|---|---|---|---|---|
| 3,207,468 | A * | 9/1965 | Lauducci | F15B 15/068 251/163 |
| 4,970,898 | A | 11/1990 | Walish et al. | |
| 5,731,522 | A | 3/1998 | Sittler | |
| 6,401,546 | B1 * | 6/2002 | Kocian | F16J 3/02 73/756 |
| 6,722,927 | B1 | 4/2004 | Eriksen et al. | |

(Continued)

OTHER PUBLICATIONS

International Search Report and Opinion for PCT/US2016/024290, dated Jun. 24, 2016, Filed Mar. 25, 2016. 17 pages.

(Continued)

*Primary Examiner* — Peter J Macchiarolo
*Assistant Examiner* — Jermaine L Jenkins
(74) *Attorney, Agent, or Firm* — Christopher R. Christenson; Kelly, Holt & Christenson, PLLC

(57) ABSTRACT

An in-line process fluid pressure transmitter is provided. The transmitter includes a process fluid connector configured to couple to a source of process fluid. A plug is coupled to the process fluid connector and has a passageway configured to convey fluid to a distal end of the plug. A pressure sensor subassembly is coupled to the plug at a weld. The pressure sensor subassembly has a pressure sensor operably coupled to the distal end of the passageway such that the pressure sensor reacts to process fluid pressure. The plug includes a sidewall encircling the weld. Transmitter electronics are coupled to the pressure sensor and configured to measure an electrical characteristic of the pressure sensor and provide a process fluid pressure value based on the measured electrical characteristic.

26 Claims, 7 Drawing Sheets

(56) References Cited

U.S. PATENT DOCUMENTS

| | | | |
|---|---|---|---|
| 8,042,401 B2 | 10/2011 | Broden | |
| 8,384,915 B2 * | 2/2013 | Petersen | B23K 31/02 |
| | | | 219/121.83 |
| 8,387,463 B2 * | 3/2013 | Hedtke | G01L 27/007 |
| | | | 73/702 |
| 9,234,776 B2 | 1/2016 | Strei | |
| 9,459,170 B2 * | 10/2016 | Haywood | G01L 9/0041 |
| 2015/0020600 A1 * | 1/2015 | Eriksen | G01L 19/0645 |
| | | | 73/706 |

OTHER PUBLICATIONS

International Preliminary Report on Patentability, dated Oct. 12, 2017, for International Patent Application No. PCT/US2016/024290, 16 pages.
First Office Action dated May 10, 2018, for Chinese Patent Application No. 201510373367.2, 19 pages including English translation.
Office Action dated Jul. 26, 2018, for Canadian Patent Application No. 2979689, 3 pages.
European Search Report dated Oct. 29, 2018, for European Patent Application No. 16773855.8, 8 pages.

\* cited by examiner

IN-LINE PROCESS FLUID PRESSURE TRANSMITTER FOR HIGH PRESSURE APPLICATIONS

BACKGROUND

Industrial process fluid pressure transmitters are used to measure the pressure of an industrial process fluid such as a slurry, liquid, vapor or gas in chemical, pulp, petroleum, pharmaceutical, food and/or other fluid processing plants. Industrial process fluid pressure transmitters are often placed near the process fluids, or in field applications. Often these field applications are subject to harsh and varying environmental conditions that provide challenges for designers of such transmitters.

The sensing element in many process fluid pressure transmitters is often a capacitance-based or resistance-based sensor. An isolation diaphragm is generally used to separate the process fluid from the electrically active sensing element thereby preventing the process fluid, which at times can be harsh, corrosive, dirty, contaminated, or at an extremely elevated temperature, from interacting with the electrical components of the pressure transmitter.

Generally, the process fluid acts against the isolation diaphragm generating a deflection of the isolation diaphragm that moves, or otherwise displaces, the fill fluid behind the diaphragm which generates an associated movement of the sensing diaphragm of the pressure sensor. The pressure sensor has an electric characteristic, such as capacitance, or resistance that varies with the applied pressure. The electrical characteristic is measured using measurement circuitry within the process fluid pressure transmitter in order to provide an output signal related to the process fluid pressure. The output signal can further be formatted in accordance with known industrial standard communication protocols and transmitted through a process communication loop to other field devices or a controller.

An in-line process fluid pressure transmitter generally has a single process fluid pressure inlet that can be coupled to a source of process fluid pressure and provides an indication of the process fluid pressure. This indication can be relative to atmosphere, such as a gage indication, or relative to a vacuum, such as an absolute pressure measurement. In-line pressure transmitters that are subject to high maximum working pressure (MWP) present particular design challenges. Simply providing a structure that is able to survive a single application of a maximum working pressure may not be robust enough to survive fatigue with repeated excursions to and beyond the maximum working pressure. Thus, for growing high pressure markets, such as subsea oil and gas wells, it is desirable to provide an in-line process fluid pressure transmitter that is suitable for extended use in such environments.

SUMMARY

An in-line process fluid pressure transmitter is provided. The transmitter includes a process fluid connector that is configured to couple to a source of process fluid. A plug is coupled to the process fluid connector and has a passageway configured to convey fluid to a distal end of the plug. A pressure sensor subassembly is coupled to the plug at a weld. The pressure sensor subassembly has a pressure sensor operably coupled to the distal end of the passageway such that the pressure sensor reacts to process fluid pressure. The plug includes a sidewall encircling the weld. Transmitter electronics are coupled to the pressure sensor and configured to measure an electrical characteristic of the pressure sensor and provide a process fluid pressure value based on the measured electrical characteristic.

DETAILED DESCRIPTION OF ILLUSTRATIVE EMBODIMENTS

Figure 1:
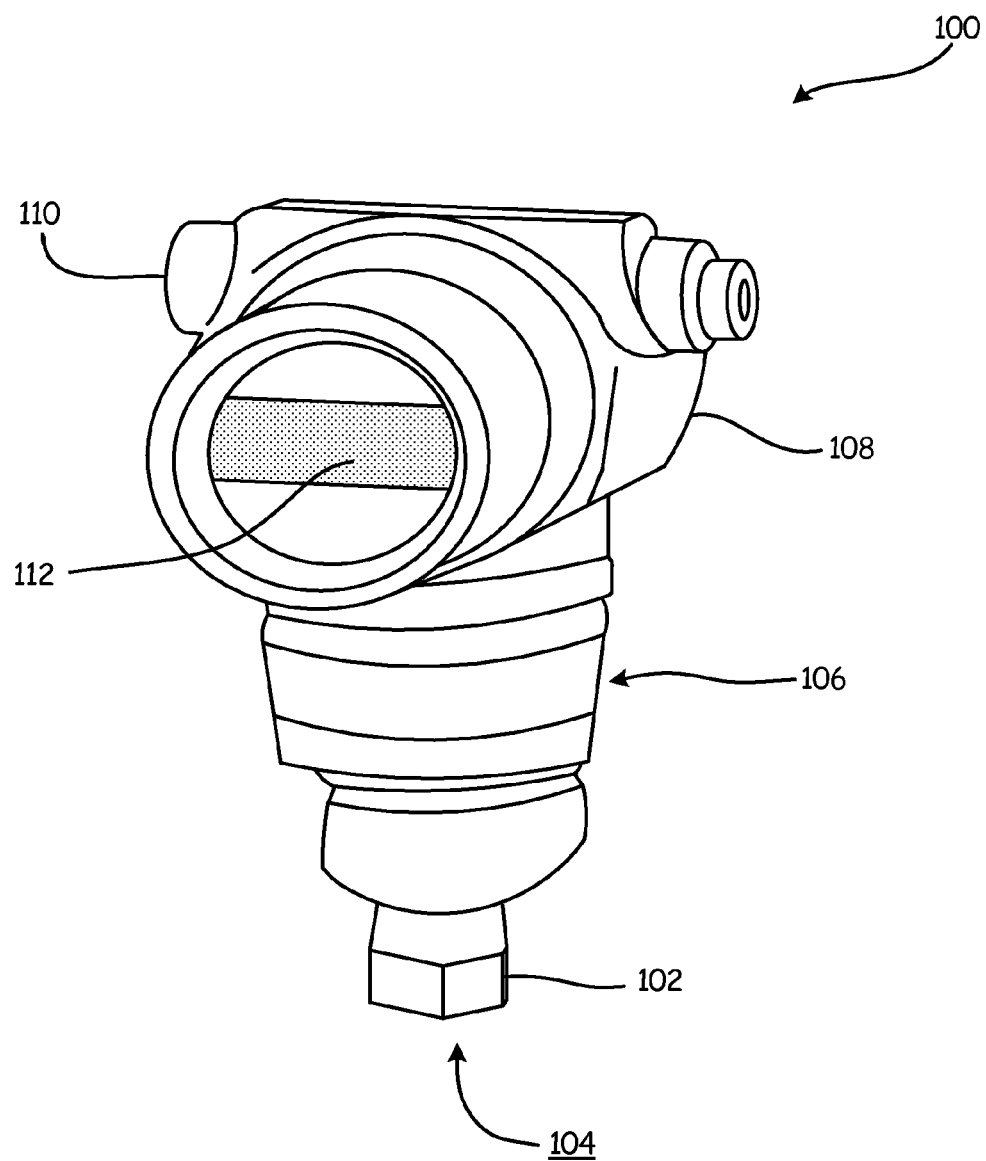
FIG. 1 is a diagrammatic perspective view of an in-line process fluid pressure transmitter with which embodiments of the present invention are particularly useful.

FIG. 1 is a diagrammatic perspective view of an in-line process fluid pressure transmitter with which embodiments of the present invention are particularly useful. Pressure transmitter 100 includes process fluid connector 102 which is configured to be coupled to a source of process fluid 104. Process fluid introduced at connector 102 bears against an isolation diaphragm that conveys the process fluid pressure to a pressure sensor disposed within sensor body 106. The pressure sensor (shown diagrammatically in FIG. 2) has an electrical characteristic, such as capacitance or resistance, which is measured by measurement circuitry in electronics enclosure 108 and converted to a process fluid pressure using suitable calculations by a controller. A process fluid pressure can be conveyed over a process communication loop via wires coupled through conduit 110 and/or displayed locally via display 112. Further, in some implementations, the process fluid pressure may be conveyed wirelessly.

Figure 2:
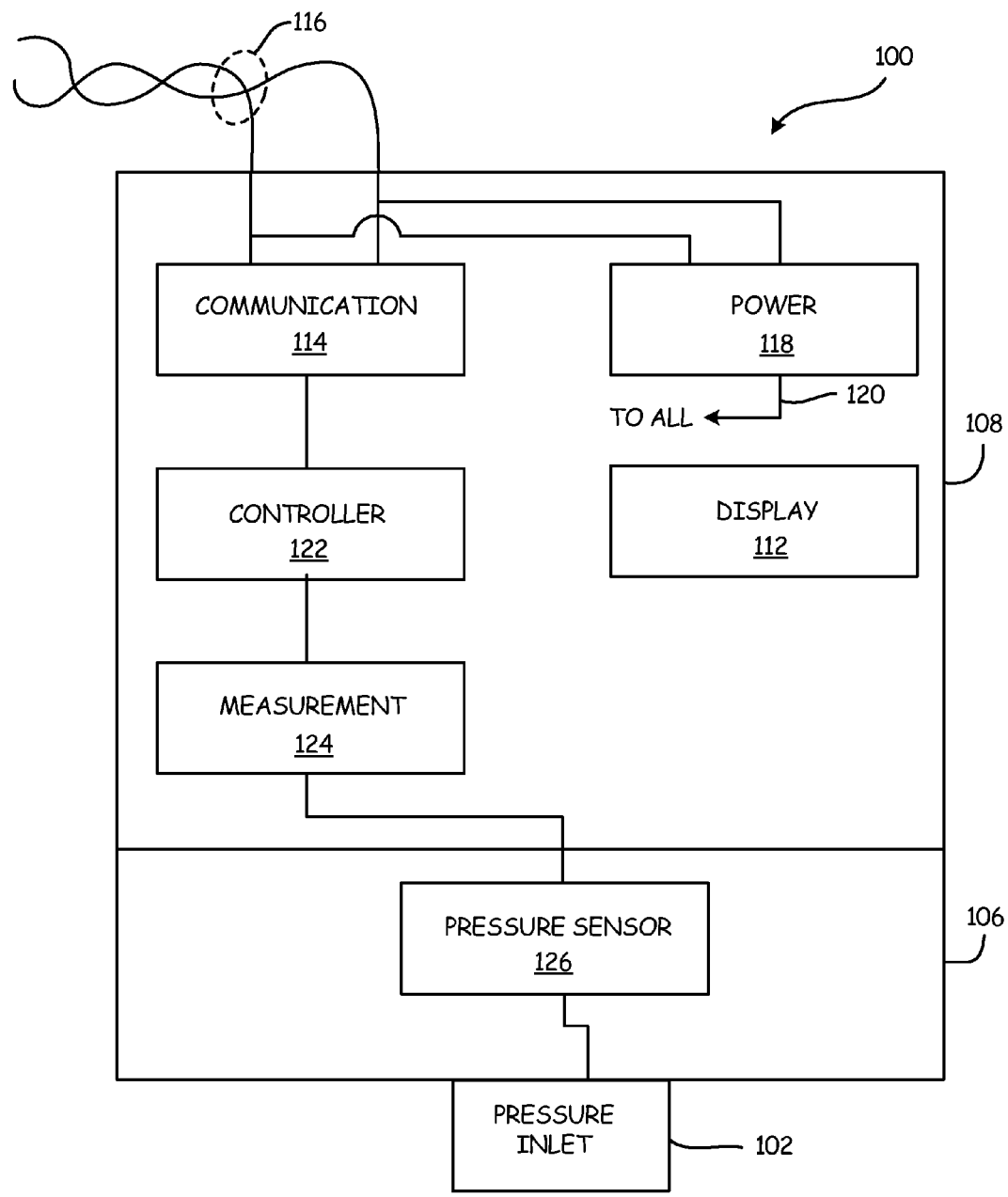
FIG. 2 is a diagrammatic view of in-line process pressure transmitter 100 with which embodiments of the present invention are particularly applicable.

FIG. 2 is a diagrammatic view of in-line process pressure transmitter 100 with which embodiments of the present invention are particularly applicable. Pressure transmitter 100 includes electronics enclosure 108 coupled to sensor body 106. Transmitter electronics are disposed within electronics enclosure 108 and include communication circuitry 114, power circuitry 118, controller 122, display 112 and measurement circuitry 124.

Communication circuitry 114 is disposed within electronic enclosure 108 and can be coupled to a process communication loop via conductors 116. By virtue of coupling to process communication loop 116, communication circuitry 114 allows in-line process pressure transmitter 100 to communicate in accordance with an industry-standard process communication protocol. Moreover, in some embodiments, transmitter 100 may receive all requisite electrical power for operation via its coupling to the process communication loop. Accordingly, pressure transmitter 100 includes power module 118 that, in some embodiments, is coupled to the process communication loop in order to supply suitable operating power to all components of transmitter 100, as indicated at reference numeral 120 labeled "to all." Examples of suitable process communication protocols include the Highway Addressable Remote Transducer (HART®) protocol, the FOUNDATION™ Fieldbus protocol, and others. Further, embodiments of the present invention include wireless process communication, such as that in accordance with IEC 62591 (WirelessHART).

Controller 122 is coupled to communication circuitry 114 as well as measurement circuitry 124 and is configured to cause measurement circuitry 124 to provide a digital indication or measurement from pressure sensor 126. This digital indication is processed, or otherwise operated upon, to generate a process pressure value that controller 122 communicates to other suitable devices via communication circuitry 114. In some embodiments, controller 122 may be a microprocessor. A local display, such as display 112, can also display the process fluid pressure, or other suitable quantities.

Aspects of the present invention generally includes structural modifications to the pressure sensor capsule designs that can be used to increase the maximum working pressure (MWP) of an in-line style pressure transmitter. In some embodiments, the MWP may possibly be increased to approximately 20,000 PSI using relatively inexpensive and easily workable 316L stainless steel and laser welded assemblies. Various embodiments provided herein generally focus on increasing the useful life of the pressure transmitter relative to high pressure fatigue loading.

Stress concentrations at the root of welds are a common limiting factor in setting the maximum working pressure of sensor assemblies. These stress concentrations typically limit the fatigue life of the design, even though the assembly may have a greater than 2.5 factor of safety against a single pressure application of the maximum working pressure. Further, other constraints on the design of the pressure sensor assemblies add to the challenge of meeting fatigue life requirements. Increasing wall thickness to improve strength also increases size, and thicker walls are generally more difficult to weld together during assembly. Welded assemblies are generally needed to prevent the loss of pressurized fluid. However, welding generally requires heat input during the welding processes that must be minimized in order to avoid damaging the sensor. This heat input generally limits the size and strength of the weld.

The materials of construction for pressure sensor subassemblies can be a limiting factor. The material is preferably inexpensive, corrosion resistant, and easy to weld. 300 series stainless steels are a common choice for meeting these requirements. However, the tradeoff for such inexpensive material (300 Series stainless steels) is their strength. 300 series stainless steels have a much lower strength than similarly inexpensive carbon steels, and 300 series stainless steels are less expensive than stronger, corrosion-resistant nickel-based alloys such as C-276 and Inconel 625. Alloy C-276 is available from Haynes International Inc., of Kokomo, Ind. under the trade designation Hastelloy C276; Inconel alloy 625, available from The Special Metal Family of Companies of New Hartford, N.Y. Alloy C276 has the following chemical composition (by % weight): Molybdenum 15.0-17.0; Chromium 14.5-16.5; Iron 4.0-7.0; Tungsten 3.0-4.5; Cobalt 2.5 maximum; Manganese 1.0 maximum; Vanadium 0.35 maximum; Carbon 0.01 maximum; Phosphorus 0.04 maximum; Sulfur 0.03 maximum; Silicon 0.08 maximum; and balance Nickel. Using different materials of construction in the same assembly can allow an optimization between cost and strength to be made. However, such different materials can introduce other challenges such as how to join the different materials.

Figure 3:
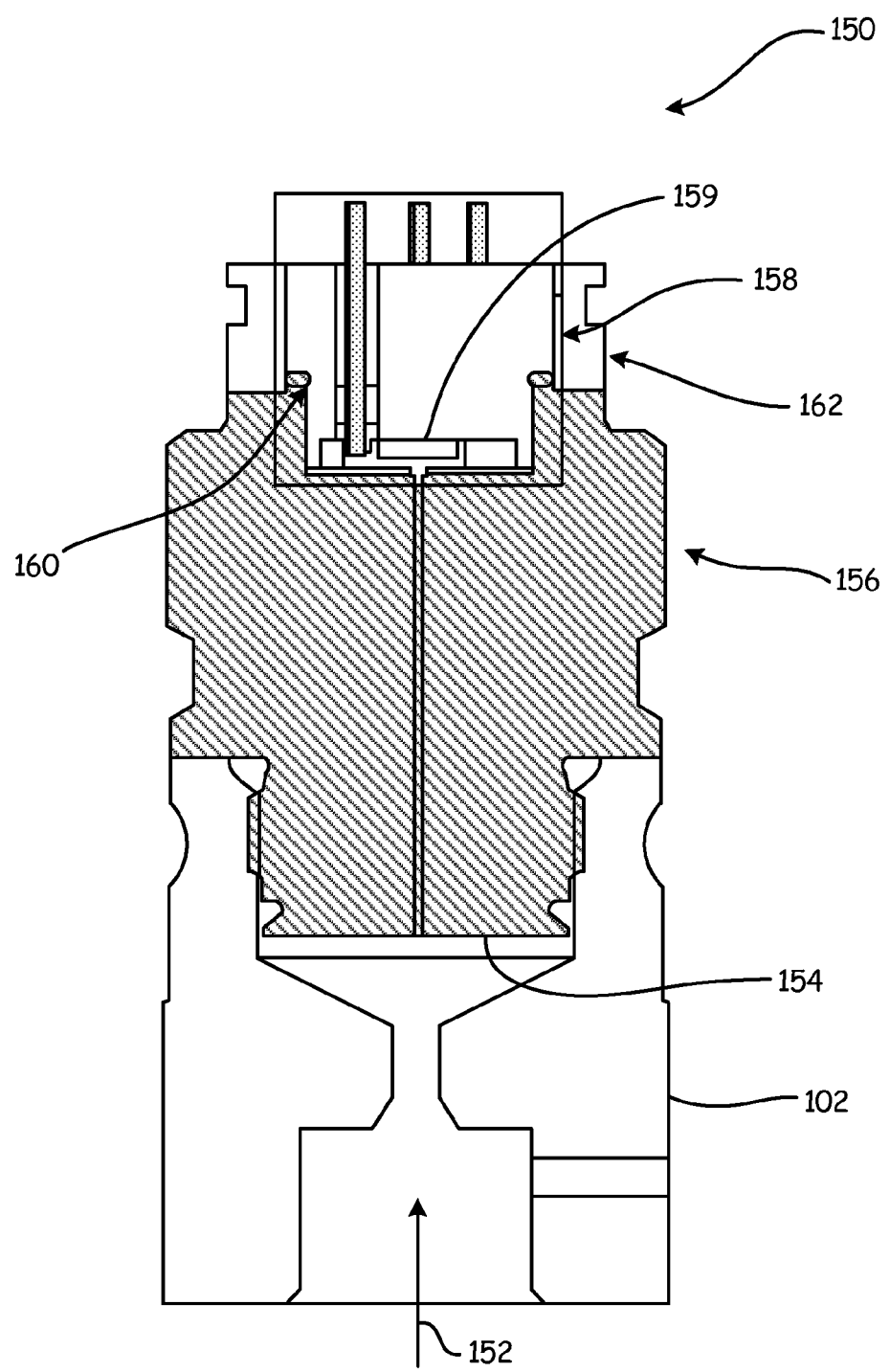
FIG. 3 is a diagrammatic view of a commercially available high pressure in-line pressure sensor assembly.

FIG. 3 is a diagrammatic view of a commercially-available high pressure in-line pressure sensor assembly. In the example shown, the sensor assembly is typically usable to approximately 10,000 PSI MWP. In sensor assembly 150, the pressure 152 is applied to process connector 102. This pressure bears against isolation diaphragm 154 and is communicated through isolator plug 156 for application at pressure sensor subassembly 158. In the example shown, isolator plug 156 is cylindrical with a diameter of approximately 1.125 inches. Pressure sensor subassembly 158 generally resides within a recess in isolator plug 156 and includes a pressure sensor 159 that deforms, or otherwise reacts, to application of process fluid pressure, and an electrical structure with an electrical characteristic that changes in response to the physical reaction. In one example, the pressure sensor is a capacitive-based pressure sensor. In the example shown, pressure sensor subassembly 158 has a diameter of about 0.6 inches. However, embodiments of the present invention are applicable to any suitable pressure sensors. Pressure sensor subassembly 158 is welded to isolator plug 156 at weld 160. Additionally, subassembly 158 is also welded to weld ring 162, but receives relatively little support from weld ring 162. Even though this design is strong enough to meet a single application of higher pressures, it may not be sufficient to withstand substantial fatigue requirements for a higher MWP. It is believed that the limiting aspect of the design is a stress concentration (a re-entrant curve) at the root of weld 160. During repeated pressure cycles at pressures higher than 10,000 PSI, weld 160 may not be strong enough to prevent large strains from forming at stress concentrations, thereby shortening fatigue life. The entire sensor assembly is primarily made of 316L stainless steel, which is corrosion resistant, easily weldable, and relatively inexpensive.

Embodiments of the present invention generally improve the fatigue life of an in-line pressure transmitter by modifying the coupling of the isolator plug and the sensor subassembly. Embodiments described herein include different designs that address the problem of stress concentrations around welds in a high pressure sensor assembly. These designs typically focus on methods for improving the fatigue life of a high pressure sensor assembly by reducing the strain in a stress concentration by increasing the strength of the assembly around the stress concentration and/or lowering the alternating strain (which drives fatigue failure) by increasing the average strain in the assembly.

For an infinite fatigue life, the stresses in the main body of a pressure sensor assembly need to be kept well below the elastic limit of the material from which the assembly is made. In some areas of the pressure sensor assembly, the peak stresses may exceed the elastic limit of the material and may even exceed the tensile strength of the material during a single application of the maximum working pressure to the device. Failure will not occur if areas surrounding the stress concentration can prevent the material in the stress concentration from stretching to the point where a crack forms (meaning the strain in the area of the stress concentration is kept below the failure strain). For multiple cycles of pressure from 0 to the MWP of the device (fatigue loading) a similar theory applies. If material surrounding the stress concentration prevents the alternating strains in the stress concentration from exceeding a critical value, then the desired life in fatigue loading may be reached, even if the peak stresses in the stress concentration exceed the elastic limit during a single application of pressure. This is called the local strain model of fatigue design.

Figure 4:
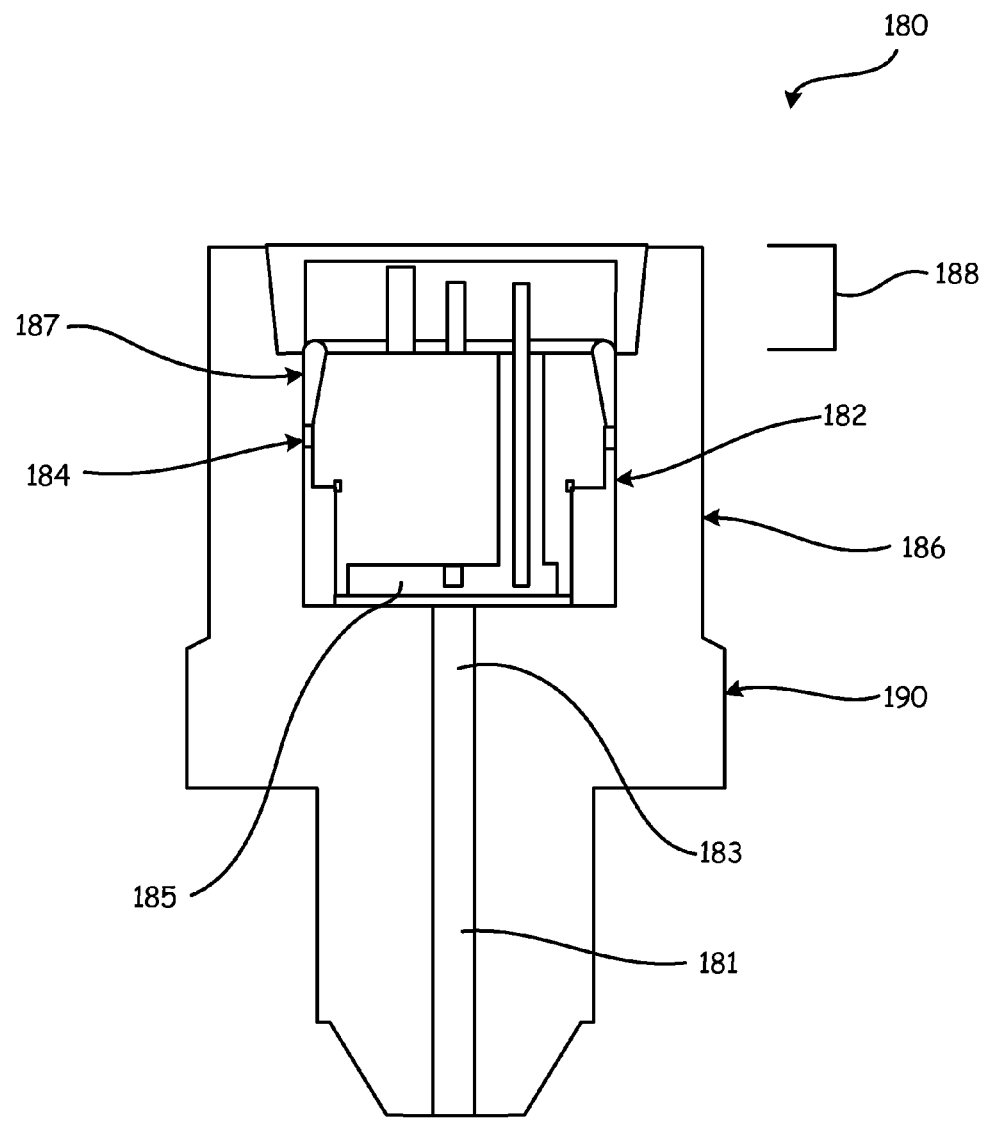
FIG. 4 is a diagrammatic view of a high pressure in-line pressure sensor subassembly in accordance with an embodiment of the present invention.

FIG. 4 is a diagrammatic view of a pressure sensor subassembly coupled to an isolator plug in accordance with an embodiment of the present invention. Sensor subassembly 180 shown in FIG. 4 uses a different isolator plug and weld than the assembly shown in FIG. 3. The isolation diaphragm is not shown in FIG. 4, however, fill fluid passageway 181 is shown conveying fill fluid from the isolation diaphragm to distal portion 183. For clarity, the process connector and isolator diaphragm are not indicated in FIGS. 4-7. While embodiments of the present invention are generally described with respect to the utilization of an isolation diaphragm and fill fluid conveying process fluid pressure from the isolation diaphragm to a pressure sensor, embodiments are applicable to any high pressure sensing arrangement. Thus, in some embodiments, the high pressure process fluid may be conveyed directly to the pressure sensor subassembly. Pressure sensor subassembly 182 is coupled to isolator plug 190 such that distal portion 183 is proximate pressure sensor 185.

While the design shown in FIG. 4 does have a stress concentration at root 184 of weld 183 coupling the sensor subassembly and the isolator plug, it has a thicker wall 186 surrounding weld 187. The stresses at the root of weld 187 may exceed the yield strength of 316L stainless steel, yet the strains are kept relatively low by thick wall 186 surrounding the stress concentration. Another important feature of assembly 180 is the relatively high wall 188 of isolator plug 190. This high wall 188 extends above sensor subassembly 182 and helps prevent bowing of sensor subassembly 182 when pressurized. Further, high wall 188 also helps prevent subsequent bending stresses at root 184 of weld 187. In addition, the stress relief machined into the isolator plug at the root 184 of the weld modifies the bending geometry so that a larger portion of the weld experiences compressive strain, which is advantageous for fatigue life. It is believed that embodiments of the present invention depicted in FIG. 4 may be usable for pressure applications with maximum working pressures as high as 15,000 PSI. While the design shown in FIG. 4 still has significant stress concentration at root 184 of weld 187 joining sensor subassembly 182 to isolator plug 190, thicker wall 186 of isolator plug 190 surrounds weld 187. Further, the extension of wall 186 above sensor subassembly 182, illustrated diagrammatically at reference numeral 188, in combination with the stress relief at the root 184 of the weld creates sufficient support to yield an acceptable fatigue life for this design. A discussion of test results relative to this design are provided below. One particular advantage of the design shown in FIG. 4 is that it may use the same sensor subassembly that is currently used in commercially available products. However, embodiments that include changes to the sensor subassembly itself may achieve higher maximum working pressure, as set forth below.

Figure 5:
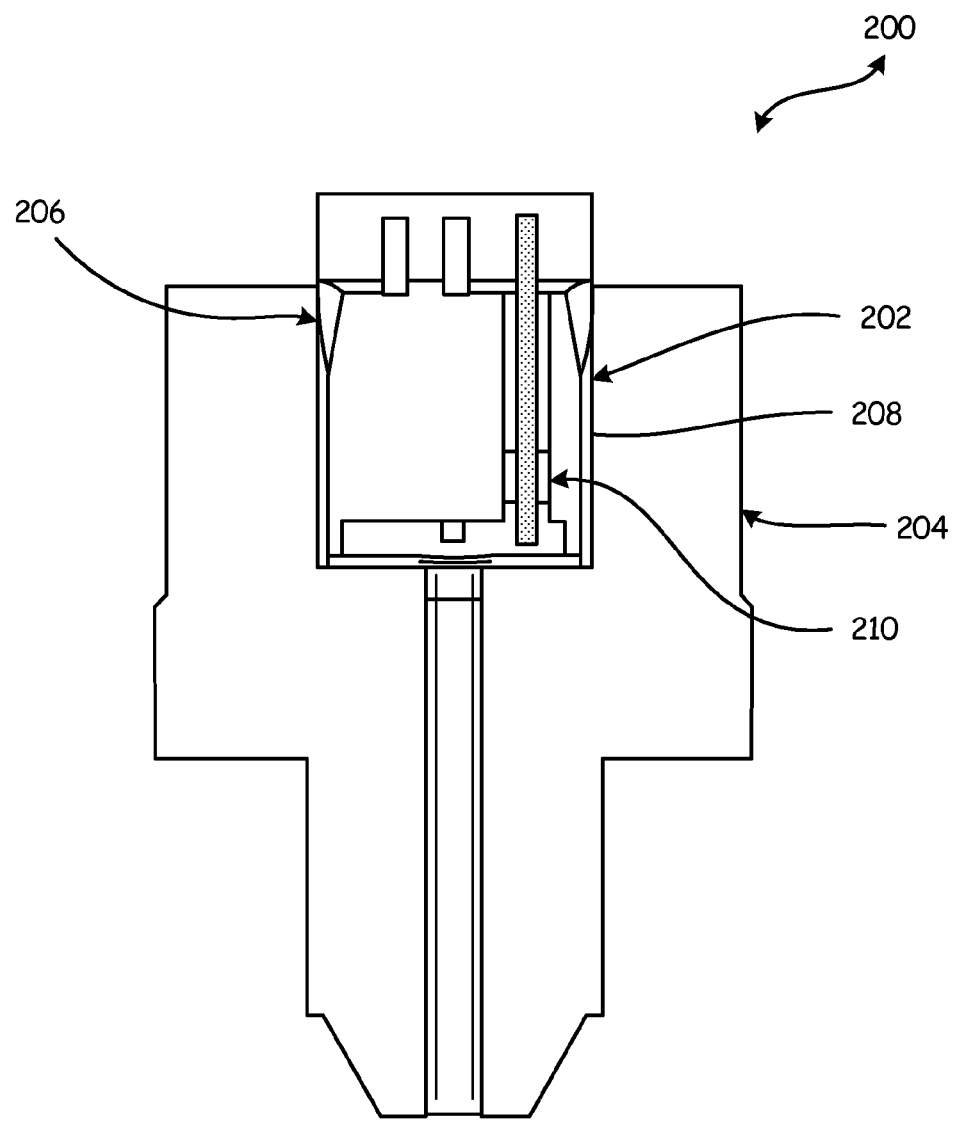
FIG. 5 is a diagrammatic view of a high pressure in-line pressure sensor subassembly in accordance with another embodiment of the present invention.

FIG. 5 is a diagrammatic view of a sensor subassembly coupled to an isolator plug in accordance with another embodiment of the present invention. Assembly 200 includes sensor subassembly 202 welded to isolator plug 204 at weld 206. Again, the process connector is not shown in FIG. 5. The assembly shown in FIG. 5 includes a sensor subassembly 202 that has a reduced diameter in comparison to the design shown in FIG. 4. The reduction of the diameter (from for example 0.6 inches to 0.5 inches) reduces the pressure load area. Additionally, in the embodiment shown in FIG. 5, isolator plug 204 is shrink fit around the outside diameter of sensor subassembly 202. This shrink fit is achieved by generating a thermal differential between isolator plug 204 and sensor subassembly 202. In one example, this may be accomplished by heating isolator plug 204 to a sufficiently high temperature such that sensor subassembly 202 may be inserted (while at a lower temperature than isolator plug 204) into bore 208 in isolator plug 204. In another example, this may be accomplished by cooling sensor subassembly 202. In still another example, isolator plug 204 may be heated while sensor subassembly 202 is cooled. The clearance between pressure sensor subassembly 202 and isolator plug 204 is caused by isolator plug 204 expanding and/or sensor subassembly 202 contracting based on their coefficients of thermal expansion and the temperature differential. When pressure sensor subassembly 202 and isolator plug 204 equalize in temperature, a large hoop stress develops, compressing isolator plug 204 around sensor subassembly 202. In some embodiments, the shrink fit may also be achieved without heating isolator plug 204, by simply press-fitting sensor subassembly 202 into isolator plug 204. Either assembly method creates a large compressive force between isolator plug 204 and sensor subassembly 202. Embodiments of the present invention also include both the application of heat to isolator plug 204 as well as the utilization of a press to engage sensor subassembly 202 into the heated isolator plug 204.

The compressive force between isolator plug 204 and pressure sensor subassembly 202 has a number of purposes. The compressive force eliminates the stress concentration at the root of the weld joining the isolator plug and sensor subassembly by placing the area in compression. Additionally, the compression places additional compression on the glass seals, such as glass seal 210 that seals the electrical connections to the sensor subassembly, thereby enabling a higher maximum working pressure. Finally, the compressive force results in a higher average strain and a lower alternating strain in the entire assembly. Lower alternating strains result in a longer life during fatigue loading, while the average strains are not so high that they unacceptably reduce the burst pressure of the assembly.

Pressure fatigue testing was performed on the various assemblies shown in FIGS. 3-5. Initial testing was performed for a 15,000 PSI maximum working pressure using a cyclic pressure of 0-18,000 PSI. For the design shown in FIG. 3 (commercially available design) the average number of cycles to failure was 10,000. For the design shown in FIG. 4, the same application of cyclic pressure took an average of 40,000 cycles before that design failed. Finally, with respect to the design shown in FIG. 5, no failures were indicated at 100,000 cycles of the same cyclic pressure. When pressure cycled from 0-24,000 PSI, the design shown in FIG. 5 survived an additional 100,000 cycles, thereby indicating that the design will likely suffice for up to 20,000 PSI MWP.

Thus far, embodiments of the present invention have generally utilized various components that are formed of the same materials. Examples of such materials include 300 series stainless steel, duplex stainless steel, and super-austenitic stainless steel. However, it is contemplated that some variations in the materials can be accommodated and still allow effective welds between the pressure sensor subassembly and the isolator plug. For example, one component (pressure sensor subassembly) may be formed of 300 series stainless steel and the other component (isolator plug) is formed of a different material that is still weldable to the first component. Examples, of such combinations include 300 series stainless steel/22% Cr duplex stainless steel; 300 series stainless steel/25% Cr duplex stainless steel; 300 series stainless steel/super-austenitic stainless steel. These materials have good corrosion resistance and can be easily welded together. However, 316L stainless steel is relatively low in strength when compared to carbon steels or precipitation hardening steels such as 17-4PH stainless steel. Welding to 316 stainless steel subassembly components is a primary challenge when using such higher strength materials. Welding is required for assemblies that will not leak.

Figure 6:
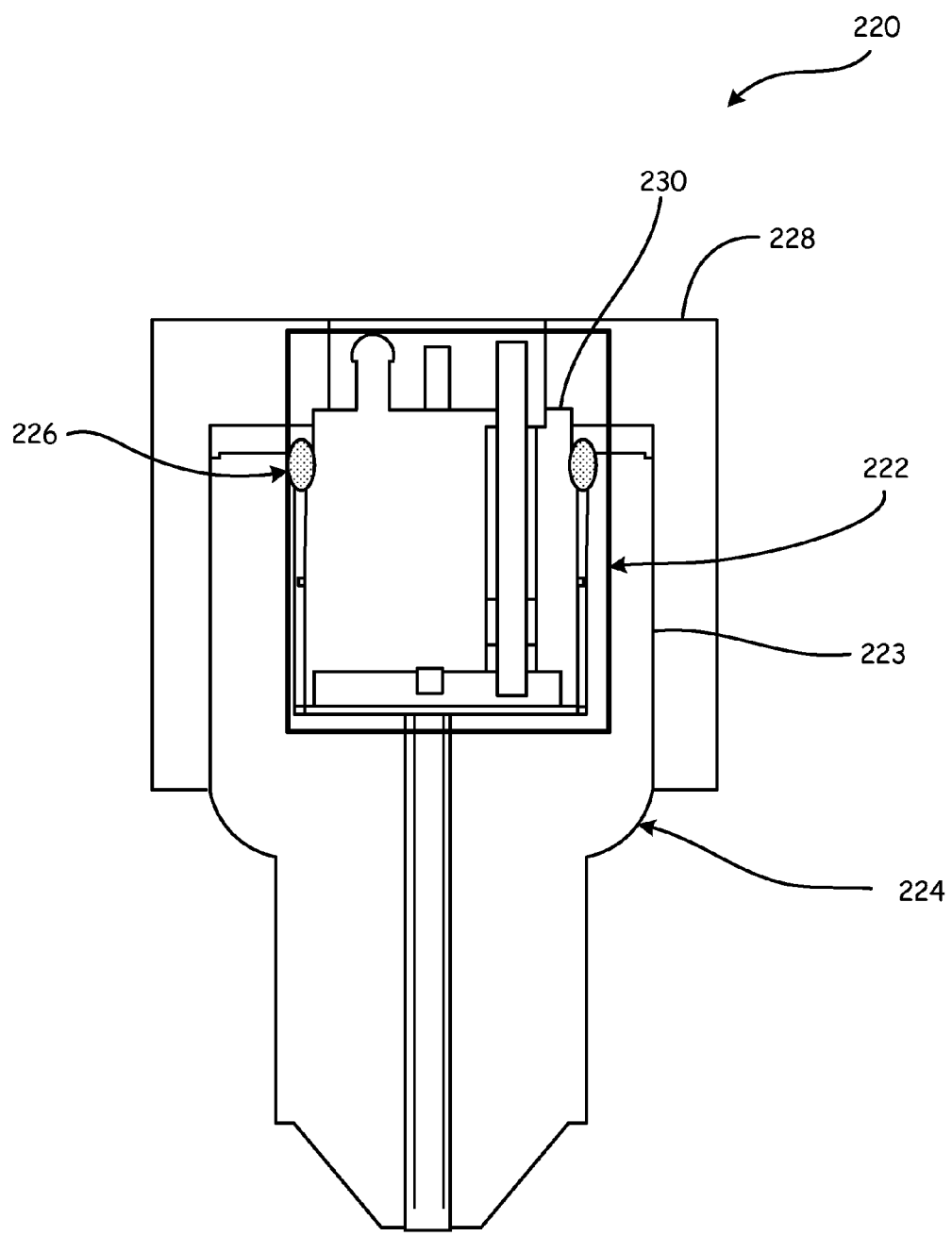
FIG. 6 is a diagrammatic view of a high pressure in-line pressure sensor subassembly in accordance with another embodiment of the present invention.

FIG. 6 is a diagrammatic view of a high pressure sensor subassembly in accordance with another embodiment of the present invention. High pressure sensor subassembly 220 uses a higher strength alloy in order to improve the fatigue life of the assembly. FIG. 6 illustrates subassembly 220 including sensor subassembly 222 welded to isolator plug 224 at weld 226. Sensor subassembly 222 is similar to sensor subassembly 202, except that sensor subassembly 222 includes a ledge 230 that extends beyond weld 226. Further, high pressure sensor subassembly 220 differs from assembly 200 (shown in FIG. 5) with the addition of support ring 228 formed of a high strength alloy, such as a precipitation hardening stainless steel. Ring 228 is applied around wall 223 of isolator plug 224. In one embodiment, support ring 228 is press-fit over isolator plug 224 so that radial compression is produced within isolator plug 224 and sensor subassembly 222 while keeping the tensile hoop stresses in support ring 228. During the press-fit, support ring 228 is pressed axially onto isolator plug 224 until support ring 228 contacts ledge 230 of sensor subassembly 222. Upon making contact, support ring 228 is pressed further, thereby producing axial compression on isolator plug 224 and sensor subassembly 222. When the force of the press is released, the axial compression is held by the friction force between support ring 228 and wall 223 of isolator plug 224. This axial compression relieves some of the axial tension introduced through Poisson's ratio from the radial compression, and using an external compression source removes the potential to relieve compressive force during the welding process.

Figure 7:
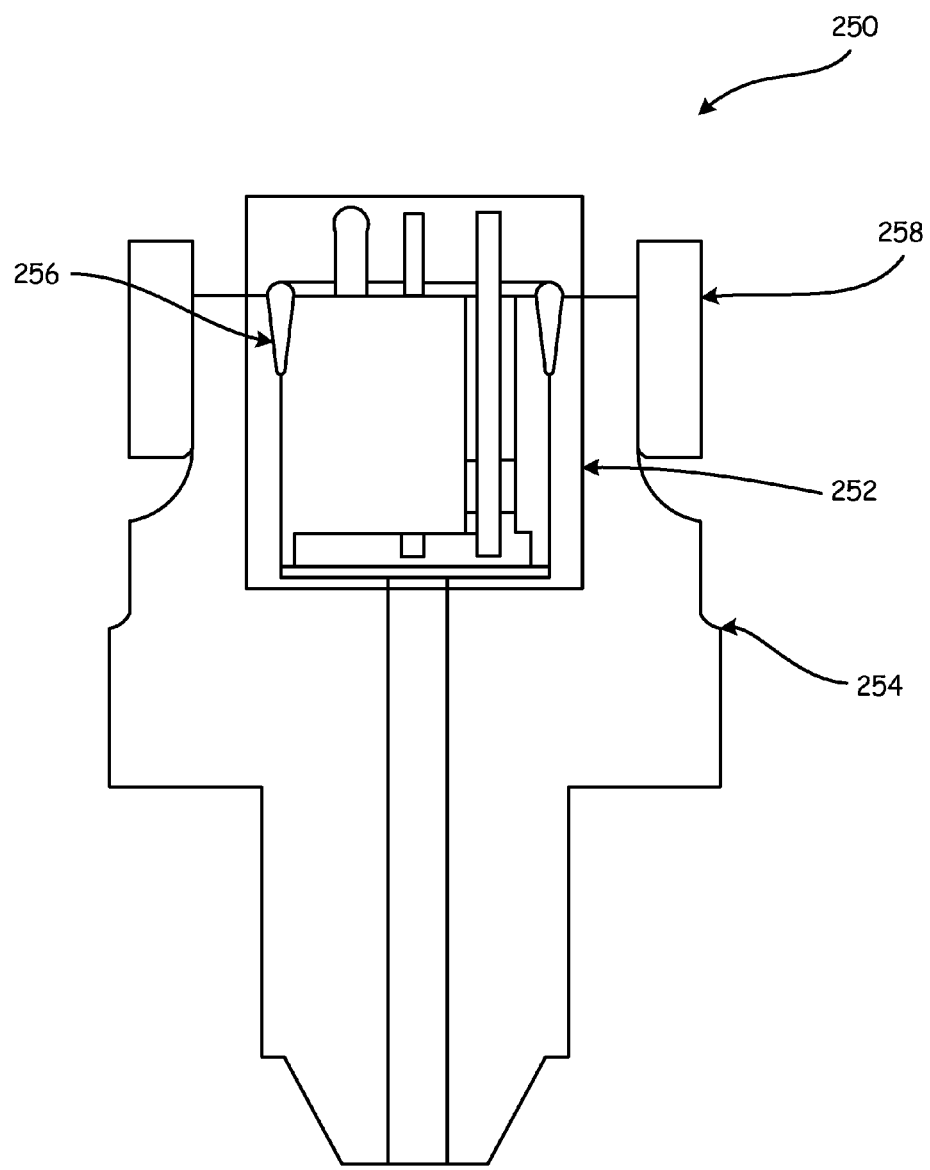
FIG. 7 is a diagrammatic view of an additional support ring applied to a pressure sensor subassembly in accordance with another embodiment of the present invention.

FIG. 7 is a diagrammatic view of an additional support ring applied to a sensor subassembly/isolator plug in accordance with another embodiment of the present invention. Assembly 250 includes pressure sensor subassembly 252 welded to isolator plug 254 at weld 256. A support ring 258 formed of a high strength alloy, such as a precipitation-hardening stainless steel, is applied around isolator plug 254 in the region of weld 256. Accordingly, the design of assembly 250 is similar to that shown in FIG. 6 except that it does not provide the axial compression on the top of sensor subassembly 252.

Although the present invention has been described with reference to preferred embodiments, workers skilled in the art will recognize that changes may be made in form and detail without departing from the spirit and scope of the invention.

What is claimed is:

1. An in-line process fluid pressure transmitter comprising:
    a process fluid connector configured to couple to a source of process fluid;
    a plug coupled to the process fluid connector, the plug having a passageway configured to convey fluid to a distal end of the plug;
    a pressure sensor subassembly coupled to the plug at a weld, the pressure sensor subassembly having a pressure sensor operably coupled to the distal end of the passageway such that the pressure sensor reacts to process fluid pressure;
    wherein the plug includes a sidewall encircling the weld and configured to apply a radially compressive force to the weld to reduce stress concentration at the weld by applying the radially compressive force; and
    transmitter electronics coupled to the pressure sensor and configured to measure an electrical characteristic of the pressure sensor and provide a process fluid pressure value based on the measured electrical characteristic.

2. The in-line process fluid pressure transmitter of claim 1, wherein the plug is an isolator plug having an isolation diaphragm disposed to contact the process fluid and deflect in response to process fluid pressure, and wherein the isolator plug has fill fluid disposed in the passageway.

3. The in-line process fluid pressure transmitter of claim 1, wherein the sidewall extends axially beyond the pressure sensor subassembly.

4. The in-line process fluid pressure transmitter of claim 1, wherein the pressure sensor subassembly has a diameter of about 0.5 inches.

5. The in-line process fluid pressure transmitter of claim 1, wherein the plug and the pressure sensor subassembly are formed of the same material.

6. The in-line process fluid pressure transmitter of claim 5, wherein the material is selected from the group consisting of 300 series stainless, duplex stainless steel, and super-austenitic stainless steel.

7. The in-line process fluid pressure transmitter of claim 1, wherein one of the pressure sensor subassembly and the plug is formed of 300 series stainless steel while the other is formed of duplex stainless steel.

8. The in-line process fluid pressure transmitter of claim 1, wherein one of the pressure sensor subassembly and the plug is formed of 300 series stainless steel while the other is formed of super-austenitic stainless steel.

9. The in-line process fluid pressure transmitter of claim 1, and further comprising a support ring disposed about an external diameter of the sidewall.

10. The in-line process fluid pressure transmitter of claim 9, wherein the support ring is configured to apply a radially compressive force to the sidewall.

11. The in-line process fluid pressure transmitter of claim 10, wherein the support ring, is press-fit onto the sidewall.

12. The in-line process fluid pressure transmitter of claim 11, wherein the support ring is formed of a different material than the isolator plug.

13. The in-line process fluid pressure transmitter of claim 12, wherein the support ring is formed of a precipitation hardening stainless steel.

14. The in-line process fluid pressure transmitter of claim 10, wherein the support ring is shrink-fit onto the sidewall.

15. The in-line process fluid pressure transmitter of claim 9, wherein the support ring includes an endcap that is configured to engage a ledge of the pressure sensor subassembly.

16. The in-line process fluid pressure transmitter of claim 15, wherein the endcap is configured to apply an axial compression to the ledge of the pressure sensor subassembly.

17. A method of manufacturing, an in-line process fluid pressure transmitter, the method comprising:
    providing a pressure sensor subassembly having a pressure sensor therein;
    providing an isolator plug having a sidewall defining, a bore therein;
    inserting the pressure sensor subassembly into the bore such that the sidewall extends beyond the pressure sensor subassembly, and such that the isolator plug is shrink fit around the outside diameter of the subassembly; and welding the pressure sensor subassembly to the isolator plug.

18. A method of manufacturing an in-line process fluid pressure transmitter, the method comprising:

providing a pressure sensor subassembly having a pressure sensor therein;

providing an isolator plug having a sidewall defining a bore therein; and coupling the pressure sensor subassembly to the isolator plug at the weld such that the sidewall exerts a radially compressive force on the weld to reduce stress concentration at the weld by applying the radially compressive force.

19. The method of claim 18, wherein coupling the pressure sensor subassembly to the isolator plug includes heating the sideman relative to the pressure sensor subassembly.

20. The method of claim 18, wherein coupling the pressure sensor subassembly to the isolator plug includes pressing the pressure sensor subassembly into the bore.

21. The method of claim 18, and further comprising obtaining a support ring formed of a different material than the isolator plug and applying the support ring around the sidewall.

22. The method of claim 21, wherein applying the support ring around the sidewall includes pressing the support ring onto the sidewall.

23. The method of claim 21, wherein applying the support ring onto the sidewall includes axially moving the support ring until a surface of the support ring contacts a ledge of the pressure sensor subassembly.

24. The method of claim 18, wherein coupling the pressure sensor subassembly to the isolator plug includes generating a thermal differential between the pressure sensor subassembly and the isolator plug.

25. The method of claim 24, wherein generating the thermal differential includes cooling the pressure sensor subassembly.

26. The method of claim 25, wherein generating the thermal differential includes heating the isolator plug before inserting the pressure sensor subassembly into the bore.

* * * * *

UNITED STATES PATENT AND TRADEMARK OFFICE
CERTIFICATE OF CORRECTION

PATENT NO. : 10,209,154 B2
APPLICATION NO. : 14/672647
DATED : February 19, 2019
INVENTOR(S) : Strei et al.

Page 1 of 1

It is certified that error appears in the above-identified patent and that said Letters Patent is hereby corrected as shown below:

In the Claims

In Column 9, Claim 19, Line 19, "sideman" should be changed to "sidewall"

Signed and Sealed this
Third Day of September, 2019

Andrei Iancu
*Director of the United States Patent and Trademark Office*